(12) United States Patent
Ageta et al.

(10) Patent No.: US 7,249,323 B2
(45) Date of Patent: Jul. 24, 2007

(54) INFORMATION PROCESSING APPARATUS, CONTROL APPARATUS AND RECORDING MEDIUM

(75) Inventors: Masato Ageta, Kawasaki (JP); Kazuhiro Takeda, Kawasaki (JP); Yoshiko Motoyama, Kawasaki (JP); Takashi Suda, Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 362 days.

(21) Appl. No.: 09/960,949

(22) Filed: Sep. 25, 2001

(65) Prior Publication Data

US 2002/0140723 A1    Oct. 3, 2002

(30) Foreign Application Priority Data

Mar. 30, 2001  (JP)  ............................. 2001-100838

(51) Int. Cl.
*G06F 17/00*  (2006.01)

(52) U.S. Cl. ...................... 715/752; 715/727

(58) Field of Classification Search ................ 715/728, 715/729, 865, 752, 753; 345/565, 728, 729
See application file for complete search history.

(56) References Cited

U.S. PATENT DOCUMENTS

| | | | | |
|---|---|---|---|---|
| 5,557,659 A | * | 9/1996 | Hyde-Thomson | 379/88.13 |
| 6,061,718 A | * | 5/2000 | Nelson | 709/206 |
| 6,182,041 B1 | * | 1/2001 | Li et al. | 704/260 |
| 6,324,511 B1 | * | 11/2001 | Kiraly et al. | 704/260 |
| 6,335,963 B1 | * | 1/2002 | Bosco | 379/88.12 |
| 6,400,810 B1 | * | 6/2002 | Skladman et al. | 379/93.24 |
| 6,477,494 B2 | * | 11/2002 | Hyde-Thomson et al. | 704/260 |
| 6,487,533 B2 | * | 11/2002 | Hyde-Thomson et al. | 704/260 |
| 6,707,891 B1 | * | 3/2004 | Guedalia | 379/88.17 |
| 6,801,793 B1 | * | 10/2004 | Aarnio et al. | 455/566 |
| 2002/0035476 A1 | * | 3/2002 | Ryu et al. | 704/272 |

FOREIGN PATENT DOCUMENTS

| | | |
|---|---|---|
| JP | HEI 06-152843 | 5/1994 |
| JP | HEI-06-332822 | 12/1994 |
| JP | HEI 08-167916 | 6/1996 |
| JP | 09-190328 | 7/1997 |
| JP | 11-150591 | 6/1999 |
| JP | 2000-148346 | 5/2000 |
| JP | 2000-253113 | 9/2000 |
| JP | 2000-284858 | 10/2000 |
| JP | 2001-027913 | 1/2001 |

* cited by examiner

*Primary Examiner*—Kristine Kincaid
*Assistant Examiner*—Thanh Vu
(74) *Attorney, Agent, or Firm*—Staas & Halsey LLP (57) ABSTRACT

An apparatus has a main display screen and an auxiliary display screen being smaller in size than the main display screen, and a received mail is displayed on a scroll basis on the auxiliary display screen and is outputted in form of a voice reading aloud the received mail in synchronism with the display.

20 Claims, 8 Drawing Sheets

INFORMATION PROCESSING APPARATUS, CONTROL APPARATUS AND RECORDING MEDIUM

BACKGROUND OF THE INVENTION

1. Field of the Invention

The present invention relates to an information processing apparatus for indicating information, a control apparatus for controlling the information processing apparatus, a program that causes a computer to operate as the information processing apparatus and the control apparatus, and a recording medium recording such a program.

2. Description of the Related Art

Recently, a communication by an electronic mail via a communication line is in great vogue. When a communication by an electronic mail is performed using a personal computer, there is adopted such a scheme that a program for transmitting and receiving an electronic mail is initiated to display a screen for electronic mail, and when an electronic mail is transmitted, a sentence is inputted and sent, and when contents of a received mail are confirmed, the received mail is displayed on the screen to confirm the same. Further it is known that the personal computer has a function of reading the received mail in order to confirm the received mail.

In the event that an electronic mail is received in the mid way that an image plane, which is different from an image plane for electronic mail, is displayed on a display screen to perform a work, it is troublesome that the received electronic mail is displayed on the same display screen, or alternatively it may be obliged to interrupt a work now carried out. Thus, in order to avoid such a problem, it is known that there is provided a small auxiliary display screen in addition to the display screen, and it is displayed on the auxiliary display screen that an electronic mail is received.

In the event that receiving of an electronic mail is informed using the auxiliary display screen, it is also known that even if a power source of the computer turns off, the power source turns on for only the necessary portion to inform of receiving of the electronic mail.

Of various schemes of informing reception of an electronic mail, a scheme, in which an auxiliary display screen is provided in addition to a main display screen, and it is displayed on the auxiliary display screen that an electronic mail is received, has many advantages that there is few possibility that an operator, who works while looking at the main display screen, encounters troublesomeness, or the operator is obliged to interrupt working. And in case of such a type of personal computer, for example, a so-called notebook type of personal computer, in which a display panel having a main display screen is folded when it is unused, a provision of the auxiliary display screen at a position out of a portion covered by the display panel makes it possible to display a reception of an electronic mail even in a state that the main display screen is folded.

It is noted that the auxiliary display screen is not restricted to one that is fixed on a main body of a personal computer, and it is acceptable that the auxiliary display screen is provided in form of one that is independently of the main body wherein it is connected with main body on a cable basis or a radio basis.

In order to enhance the convenience of the auxiliary display screen, it is considered that not only a reception of the electronic mail, but also contents of the received electronic mail per se are displayed on the auxiliary display screen.

However, it often happens that an auxiliary display screen is restricted to a display screen small in size generally in view of the cost and the installing space. In this case, there is associated with such a problem that the number of displayed characters is restricted to a remarkably less number of characters and thus it is difficult to display an electronic mail having a usual length of sentence.

Further, the auxiliary display screen is used for displaying contents (string of characters) Web pages obtained from a predetermined WWW server and contents notification of a private schedule as well as displaying an electronic mail.

SUMMARY OF THE INVENTION

In view of the foregoing, it is an object of the present invention to provide an information processing apparatus having a function capable of effectively informing of information, a control apparatus for controlling the information processing apparatus, and a recording medium recording a program that causes a computer to operate as the information processing apparatus and the control apparatus.

To achieve the above-mentioned objects, the present invention provides an image processing apparatus for displaying information on a display screen comprising:

an audio output section for outputting a voice; and an information notification section for displaying pieces of information of interest on said display screen a predetermined unit at a time in synchronism with one another and for causing said audio output section to output the voice involved in reading aloud of the information.

According to the image processing apparatus of the present invention as mentioned above, a voice reading aloud information of an object is outputted in synchronism with a display of the information. This feature makes it possible for an operator to sufficiently understand contents of the information through both the eyes and the ears of the operator.

In the image processing apparatus according to the present invention as mentioned above, it is preferable that said information notification section displays the pieces of information of interest on said display screen with synchronization for each a predetermined distinction code and causes said audio output section to output the voice involved in reading aloud of the information.

It happens that information to be displayed includes Chinese characters and acronyms in which the number of characters is not coincident with the length of reading. Synchronization for each a predetermined distinction code (for example, a period of a sentence) makes it possible to establish synchronization between the display and the audio output in an extent involving no problem.

To achieve the above-mentioned objects, the present invention provides a control apparatus for controlling display of information onto a display screen in an image processing apparatus, said control apparatus comprising:

an information notification section for displaying pieces of information of interest on said display screen a predetermined unit at a time in synchronism with one another and for causing an audio output section to output a voice involved in reading aloud of the information.

To achieve the above-mentioned objects, the present invention provides a recording medium capable of being read by a computer displaying information on a display screen, said recording medium storing a program for causing said computer to cause an audio output section to output a voice involved in reading aloud of information of interest, and to display pieces of information of interest on said display screen a predetermined unit at a time in synchronism with one another with respect to reading aloud.

DETAILED DESCRIPTION OF PREFERRED EMBODIMENTS

Embodiments of the present invention will be described with reference to the accompanying drawings. Here, there will be explained a personal computer having a function of receiving an electronic mail.

According to the present embodiment, there is raised by way of example one in which the present invention is applied to an electronic mail program. It is noted, however, that the present invention is applicable to another program as far as it is concerned with a program capable of displaying information on an auxiliary display screen, such as a Web contents display program, a private schedule program, and a word processor program.

Figure 1:
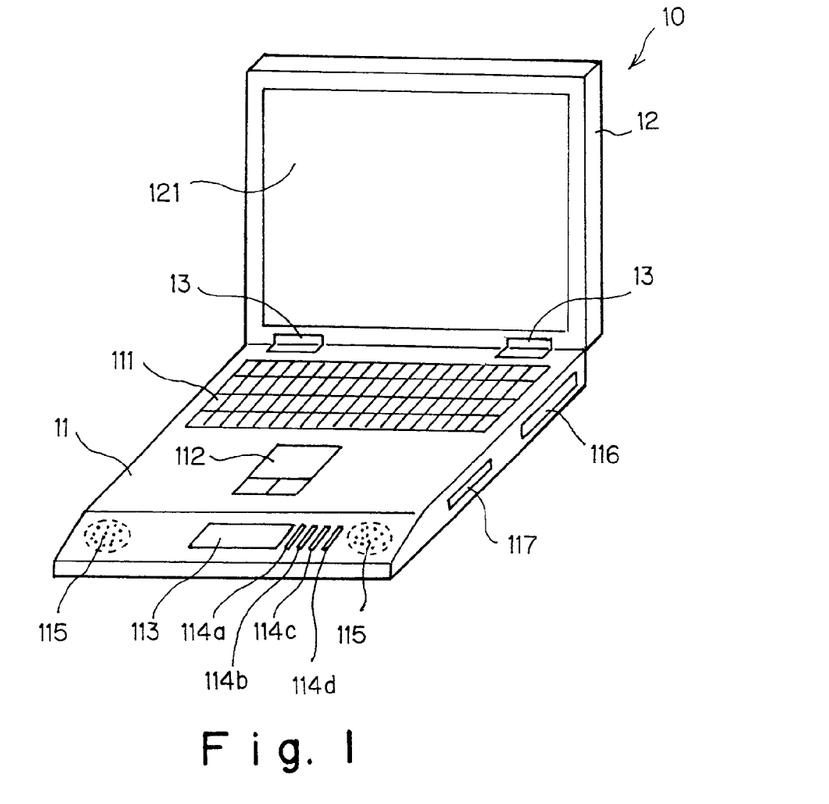
FIG. 1 is a schematic diagram of a notebook type of personal computer, which operates as an embodiment of an information processing apparatus according to the present invention.

FIG. 1 is a schematic diagram of a notebook type of personal computer, which operates as an embodiment of an information processing apparatus according to the present invention.

A notebook type of personal computer 10 comprises a main frame 11 and a display panel 12. The display panel 12 is rotatably mounted on the main frame 11 by hinges 13.

The main frame 11 incorporates therein a CPU, a magnetic disk and the like. On the top of the main frame 11, there are disposed a keyboard 111 and a track pad 112. On the main frame 11, there are further disposed an auxiliary display screen 113 comprising a compact liquid crystal panel, and four auxiliary operation buttons 114a, 114b, 114c and 114d for operating electronic mail and the like displayed on the auxiliary display screen 113. On both sides of those elements, there are disposed speakers 115. Here, the speakers themselves are incorporated into the main frame 11, and sounds emanated from the speakers are outputted through a number of apertures provided on the main frame 11. Further, on one side of the main frame 11, there are provided a CD-ROM loading aperture 116 on which a CD-ROM is mounted, and a flexible disk loading aperture (FD-loading aperture) 117 on which a flexible disk (FD) is mounted.

On the display panel 12, there is disposed a main display screen 121 comprising a liquid crystal panel placed below the display panel 12 in a state that the display panel 12 is folded in such a way that the display panel 12 covers the top of the main frame 11.

Figure 2:
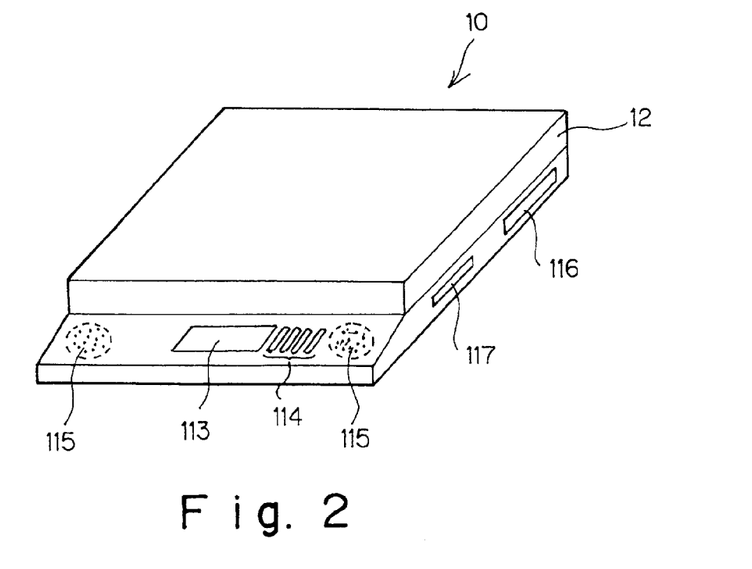
FIG. 2 is a view showing a state in which a display panel of the notebook type of personal computer shown in FIG. 1 is folded on the top of the main frame.

FIG. 2 is a view showing a state in which the display panel 12 of the notebook type of personal computer 10 shown in FIG. 1 is folded on the top of the main frame 11.

According to the notebook type of personal computer 10, even in a state that the display panel 12 is folded as shown in FIG. 2, the auxiliary display screen 113, the four auxiliary operation buttons 114a, 114b, 114c and 114d, and the speakers 115 are disposed out of the portion covered by the display panel in the state of folding.

Figure 3:
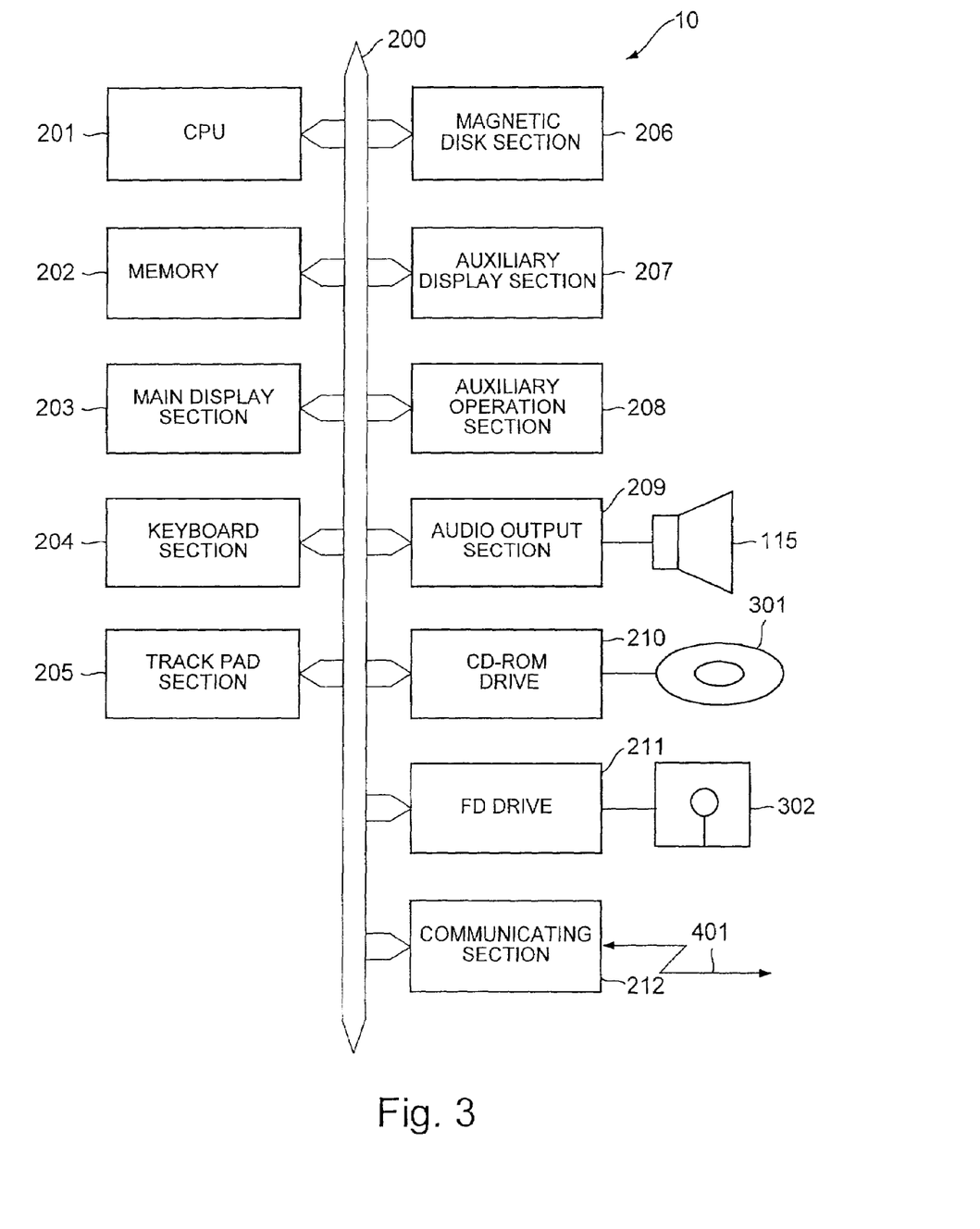
FIG. 3 is an internal structural view of the notebook type of personal computer shown in FIGS. 1 and 2.

FIG. 3 is an internal structural view of the notebook type of personal computer shown in FIGS. 1 and 2.

The notebook type of personal computer 10 comprises a CPU 201, a memory 202, a main display section 203, a keyboard section 204, a track pad section 205, a magnetic disk section 206, an auxiliary display section 207, an auxiliary operation section 208, an audio output section 209, a CD-ROM drive 210, an FD drive 211, and a communicating section 212. Those elements are connected to each other via a bus 200.

The magnetic disk section 206 comprises a magnetic disk and a magnetic disk drive. Various programs are installed in the magnetic disk. The magnetic disk section 206 has functions of reading the various programs from the magnetic disk and writing and saving new programs and data in the magnetic disk.

In the memory 202, a program read from the magnetic disk section 206 is developed, and the CPU 201 executes the program developed in the memory 202.

The main display section 203 is provided with the main display screen 121 on the display panel 12 shown in FIG. 1 and has a function of displaying various sorts of images on the main display screen 121.

The keyboard section 204 is provided with the keyboard 111 shown in FIG. 1 and has a function of transmitting a keyboard operation by an operator of the notebook type of personal computer to the CPU 201.

The track pad section 205 is provided with the track pad 112 shown in FIG. 1 and has a function of transmitting an operation of the track pad 112 by an operator of the notebook type of personal computer to the CPU 201.

The auxiliary display section 207 is provided with the auxiliary display screen 113 shown in FIG. 1 and has a function of displaying an electronic mail on the auxiliary display screen 113 on a scroll display basis and various types of information as well.

The auxiliary operation section 208 includes four auxiliary operation buttons 114a, 114b, 114c and 114d shown in FIGS. 1 and 2 and has a function of transmitting operations of the auxiliary operation buttons 114a, 114b, 114c and 114d by an operator of the notebook type of personal computer to the CPU 201.

The audio output section 209 creates an audio signal in accordance with an instruction from the CPU 201 and transmits the same to the speakers 115 that convert the audio signal into voices to emanate in space.

Incidentally, the audio output section 209 comprises an audio aloud program (audio aloud engine) and an audio output circuit. The electronic mail program, to which the present invention is applied, provides mail contents, as an object of reading aloud, to an audio reading aloud program in accordance with a control of the present invention, so that the audio reading aloud program executed by the CPU 201 creates the audio signal in accordance with the mail contents utilizing the audio output circuit.

The CD-ROM drive 210 accesses a CD-ROM 301 loaded through the CD-ROM loading aperture 116 shown in FIGS. 1 and 2 to upload programs and data stored in the CD-ROM 301 into the notebook type of personal computer 10.

The FD drive 211 accesses a flexible disk (FD) 302 loaded through the flexible disk loading aperture (FD-loading aperture) 117 shown in FIGS. 1 and 2 so that data stored in the FD 302 are received by the notebook type of personal computer 10, or data or the like are written into the FD 302 from the notebook type of personal computer 10.

It is acceptable that programs stored in the FD 302 instead of the CD-ROM 301 are uploaded into the notebook type of personal computer 10.

The communicating section 212 is connected to a communicating line 401 and has a function of communication for an electronic mail.

It is acceptable that a program, to which the present invention is applied, is recorded onto a portable type of recording medium such as the above-mentioned CD-ROM and FD, and is read out from the recording medium so that the program is uploaded onto the notebook type of personal computer 10. Alternatively, it is acceptable that the program is recorded on a magnetic disk in the notebook type of personal computer 10 beforehand. Further, it is acceptable that the communicating line 401 is utilized to obtain a program, to which the present invention saved in another apparatus is applied.

Figure 4:
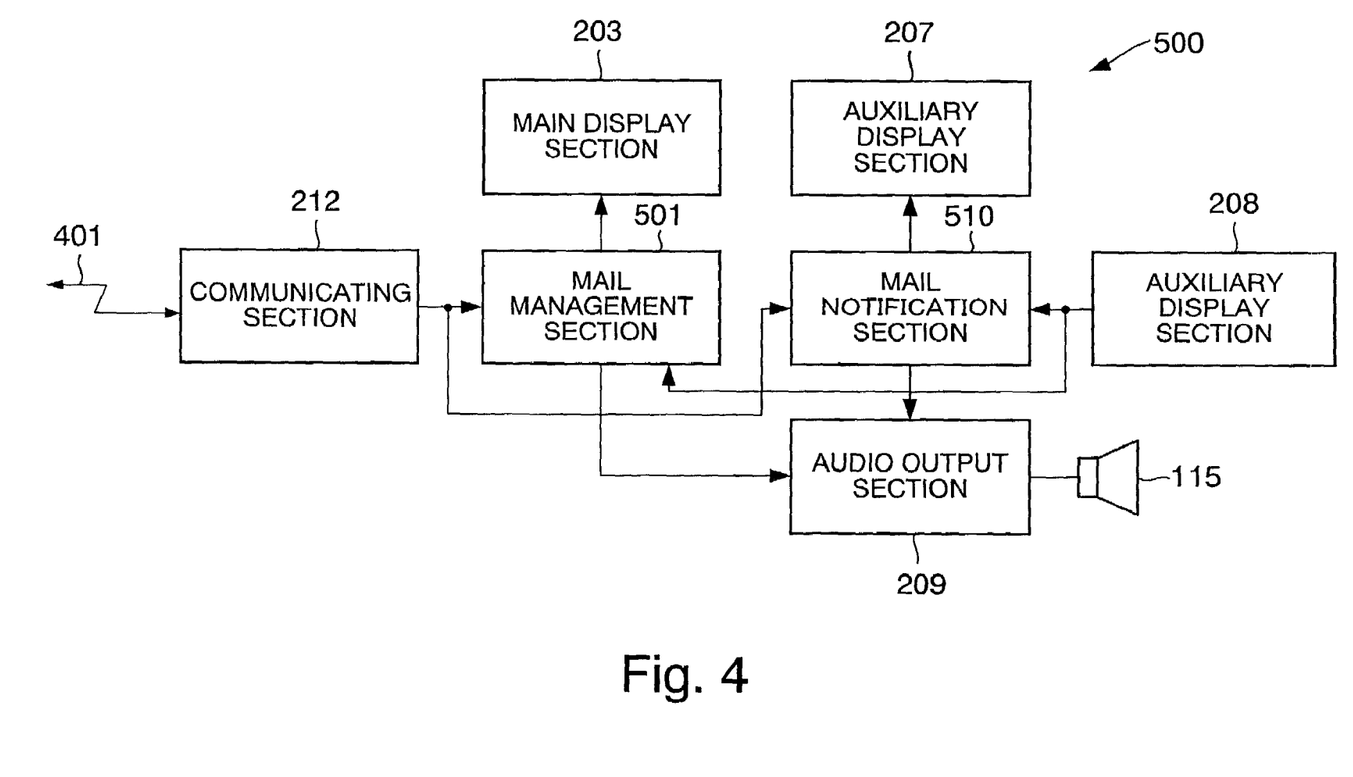
FIG. 4 is a functional block diagram of an electronic mail receiving function portion of an information processing apparatus according to an embodiment of the present invention.

FIG. 4 is a functional block diagram of an electronic mail receiving function portion of an information processing apparatus according to an embodiment of the present invention, the electronic mail receiving function portion comprising the notebook type of personal computer 10 shown in FIGS. 1 to 3 and a program for receiving the electronic mail, which is operative in the notebook type of personal computer 10.

An information processing apparatus 500 shown in FIG. 4 comprises the main display section 203, the auxiliary display section 207, the auxiliary operation section 208, the audio output section 209, the speaker 115 connected to the audio output section 209, and the communicating section 212, which are also shown in FIG. 3, and in addition a mail management section 501 and a mail notification section 510.

The mail management section 501 corresponds to the CPU 201 and the like shown in FIG. 3 on a hardware basis, and is implemented when the CPU 201 executes a mail management program dealing with an electronic mail. The mail management section 501 has such a function that an electronic mail received by the communicating section 212 is displayed on the main display screen 121 (cf. FIG. 1) of the main display section 203 in accordance with operations of the keyboard 111 and the track pad 112 by an operator, or the electronic mail is transmitted to the audio output section 209 to output voices reading aloud the electronic mail, and when an electronic mail is sent, a sentence, which is inputted through an operation of the keyboard 111 by an operator, is transmitted to the communicating section 212 to instruct the communicating section 212 to transmit the sentence in form of the electronic mail. The mail management section 501 is effective in the event that the display panel 12 of the mail management section 501 shown in FIGS. 1 and 2 is established in an available state as shown in FIG. 1.

The mail notification section 510 in FIG. 4 constitutes a main part of the present invention, and in a similar fashion to that of that mail management section 501 corresponds to the CPU 201 and the like shown in FIG. 3 on a hardware basis. The mail notification section 510 is implemented when the CPU 201 executes a received mail notification program, which will be descried hereinafter.

The mail notification section 510 has such a function that an electronic mail received by the communicating section 212 is transmitted to the auxiliary display section 207 and is scroll-displayed on the auxiliary display screen 113 constituting the auxiliary display section 207, and the electronic mail is transmitted to the audio output section 209 to output voices reading aloud the electronic mail in synchronism with the scroll display.

The mail notification section 510 performs, for example, re-scroll display and re-reading aloud of the electronic mail displayed on the auxiliary display screen returning to the top of the electronic mail, in accordance with operations of four auxiliary operation buttons 114*a*, 114*b*, 114*c* and 114*d* which constitute the auxiliary operation section 208, or performs scroll display and reading aloud of another electronic mail other than the electronic mail. In this case, the mail notification section 510 performs the above-mentioned displays and a display of another electronic mail only within a range of the mail now received.

Details of the mail notification section 510 will be described later.

Figure 5:
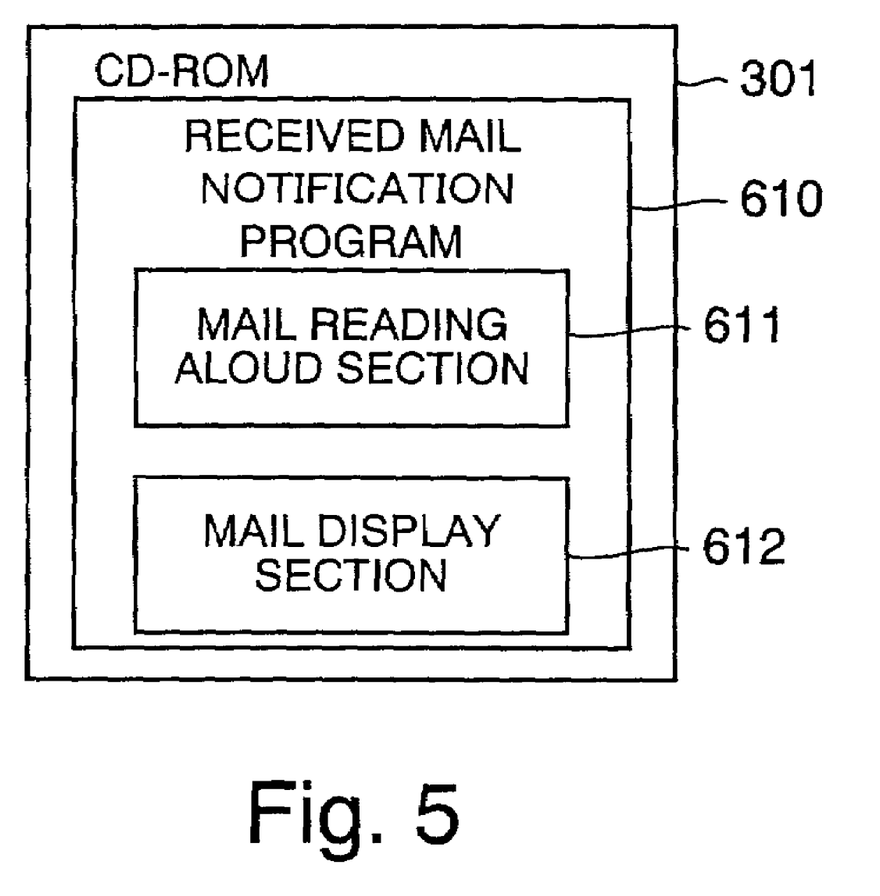
FIG. 5 is a typical illustration showing an embodiment of a received mail notification program and a received mail notification program-recording medium.

FIG. 5 is a typical illustration showing an embodiment of a received mail notification program and a received mail notification program-recording medium.

A received mail notification program 610 is stored in the CD-ROM 301. The CD-ROM 301 is loaded through the CD-ROM loading aperture 116 (cf. FIG. 1) on the notebook type of personal computer 10 to be accessed by the CD-ROM drive 210 (cf. FIG. 1), so that the received mail notification program 610 stored in the CD-ROM 301 is installed in the notebook type of personal computer 10. When the received mail notification program 610 installed in the notebook type of personal computer 10 is executed, the mail notification section 510 of the information processing apparatus 500 shown in FIG. 4 is implemented.

Here, the notebook type of personal computer 10 comprises a mail reading aloud section 611 for providing such a control that the received electronic mail is read aloud with voices, and a mail display section 612 for providing such a control that the electronic mail as an object of reading aloud for the mail reading aloud section 611 is scroll-displayed on the auxiliary display screen in synchronism with the voice reading aloud.

Figure 6:
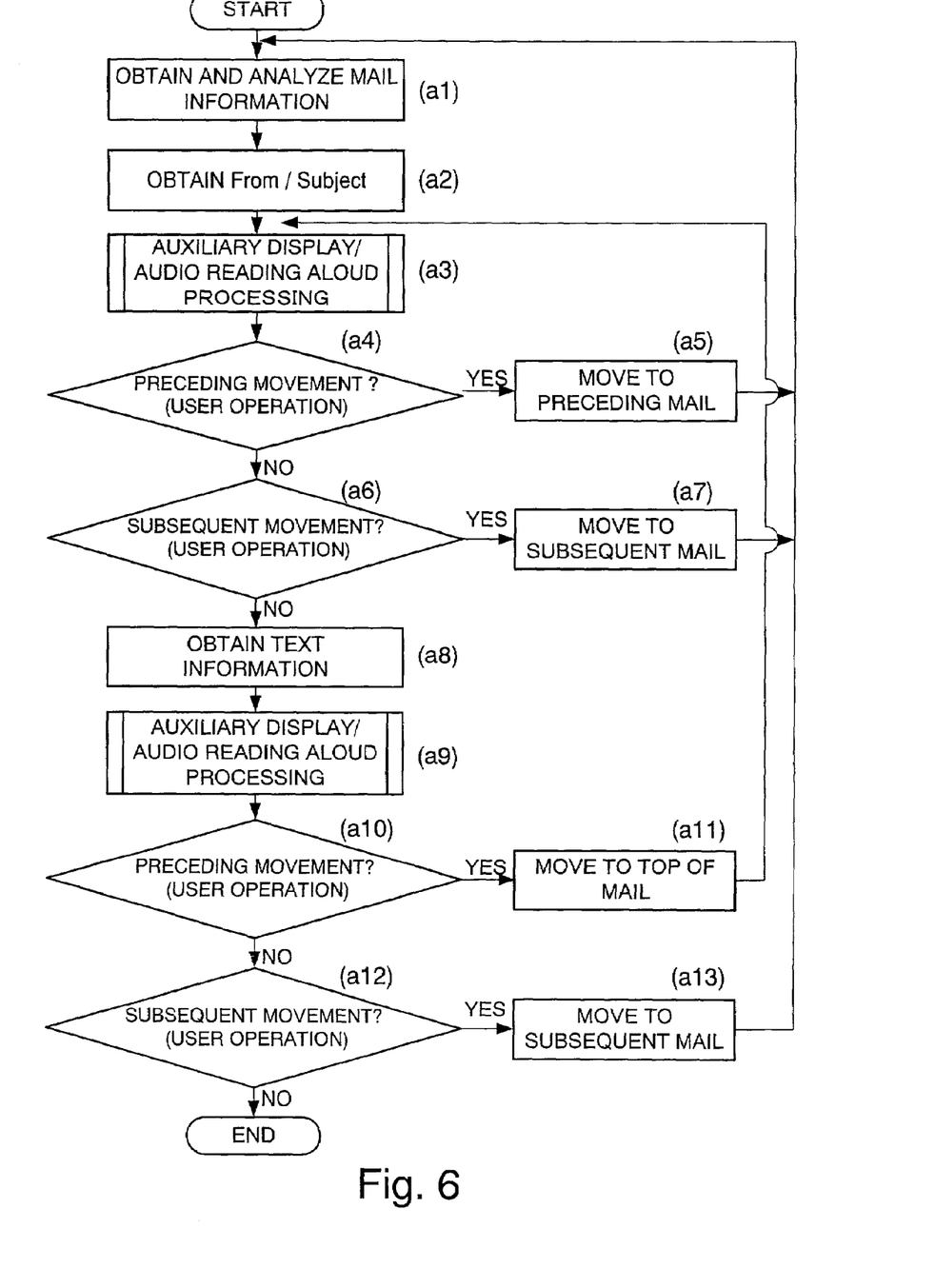
FIG. 6 is a flowchart useful for understanding the received mail notification program shown in FIG. 5.

FIG. 6 is a flowchart useful for understanding the received mail notification program shown in FIG. 5.

The communicating section 212 in FIG. 5 periodically makes inquiries at a mail server (not illustrated) as to whether a mail is received, regardless of the fact that the display panel 12 of the notebook type of personal computer 10 is folded as shown in FIG. 2. When it is detected that the mail is received, the communicating section 212 downloads the received mail from the mail server. The received mail notification program in FIG. 6 is executed when the communicating section 212 downloads the received mail.

The received mail notification program in FIG. 6 first receives and analyzes mail information (a step a1), receive From (destination)/Subject (title) information (a step a2), and performs auxiliary display/audio reading aloud processing for the From/Subject information (a step a3). Details of the auxiliary display/audio reading aloud processing will be described later.

In the event that an operator of the notebook type of personal computer 10 performs an operation of a "preceding movement" in the mid way of performing the auxiliary display/audio reading aloud processing for the From/Subject information in the step a3 (a step a4), it moves to the preceding electronic mail as to the electronic mail which is now subjected to the auxiliary display/audio reading aloud processing for the From/Subject information (a step a5). However, even if it is detected in the step a4 that the operation of the "preceding movement" is performed, when the preceding electronic mail does not exist, the operation of the "preceding movement" is ignored.

In the event that an operator of the notebook type of personal computer 10 performs an operation of a "subsequent movement" in the mid way of performing the auxiliary display/audio reading aloud processing for the From/Subject information in the step a3 (a step a6), it moves to the subsequent electronic mail as to the electronic mail which is now subjected to the auxiliary display/audio reading aloud processing for the From/Subject information (a step a7). However, in a similar fashion to that of the operation of the "preceding movement", even if it is detected in the step a6 that the operation of the "subsequent movement" is performed, when the subsequent electronic mail does not exist, the operation of the "subsequent movement" is ignored.

In a step a8, text information of the electronic mail which is now subjected to the auxiliary display/audio reading aloud processing for the From/Subject information is obtained, and the auxiliary display/audio reading aloud processing for the text information of the electronic mail is performed subsequent to the auxiliary display/audio reading aloud processing for the From/Subject information (a step a9). In the event that an operator of the notebook type of personal computer 10 performs an operation of a "preceding movement" in the mid way of performing the auxiliary display/audio reading aloud processing for the mail text (a step a10), it moves to the top of the electronic mail which is now subjected to the auxiliary display/audio reading aloud processing (a step a11), and the auxiliary display/audio reading aloud processing for the From/Subject information is again initiated.

On the other hand, in the event that an operator of the notebook type of personal computer 10 performs an operation of a "subsequent movement" in the mid way of performing the auxiliary display/audio reading aloud processing for the mail text (a step a12), in a similar fashion to that of the operation of the "subsequent movement" when the auxiliary display/audio reading aloud processing for the From/Subject information is performed, it moves to the subsequent electronic mail (a step a13).

Here, movement of a mail to the preceding mail and movement of a mail to the subsequent mail in the received mail notification program in FIG. 6 is performed only within the range of the received mail which is downloaded from the mail server by the communicating section 212.

When the auxiliary display/audio reading aloud processing for a certain mail is completed, the auxiliary display/audio reading aloud processing is performed for the subsequent mail downloaded.

Figure 7:
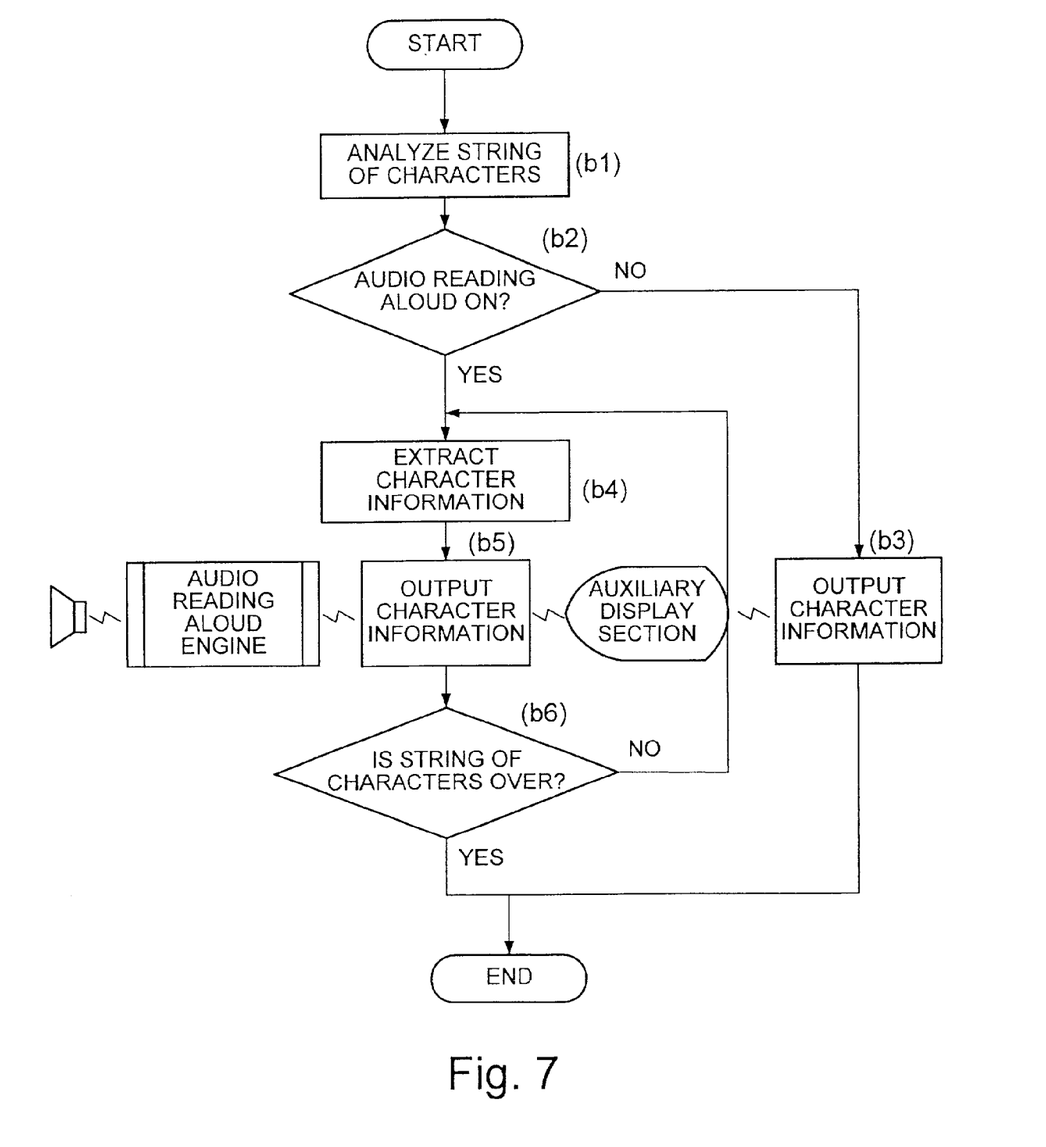
FIG. 7 is a flowchart useful for understanding auxiliary display/audio reading aloud processing.

FIG. 7 is a flowchart useful for understanding auxiliary display/audio reading aloud processing to be carried out in the steps a3 and a9 in FIG. 6.

Here, analysis of a string of characters for the obtained electronic mail is performed (a step b1). In the analysis of a string of characters, regarding the mail text, a period (.), a question mark (?), an exclamation mark (!) and the like are detected to recognize a distinction between the sentences.

In a step b2, it is determined whether a reading aloud flag turns on. The received mail notification program is arranged in such a manner that it is set up beforehand whether the reading aloud is performed on a set up screen (not illustrated). In the step b2, referring to the set up flag, it is determined whether a reading aloud is performed.

When it is decided that the reading aloud is not performed, only the scroll display for character information to the auxiliary display section is performed (a step b3). However, with respect to the From/Subject information, it is acceptable that the information is displayed by the corresponding number of characters from the top, which are capable of being displayed on the auxiliary display section on a batch basis, without performing the scroll display.

On the other hand, in the step b2, when it is decided that the reading aloud flag turns off, the process goes to a step b4 in which character information is extracted. Here, the character information is extracted by a unit of string of characters wherein a distinction by a period and the like is given in form of a unit. The extracted unit of string of characters is scroll-displayed on the auxiliary display section, and is outputted through the reading aloud engine in form of a voice (a step b5). At that time, at the head of the respective string of characters wherein a distinction by a period and the like is given in form of a unit, there is established synchronization between a reading aloud voice and a scroll display. Here, with respect to the From/Subject information, the scroll display is not performed but the batch display is performed.

In a step b6, it is determined whether pronunciation and display of all the strings of characters as the object of the pronunciation and the display are over. When it is decided that the pronunciation and the display are not over, the process returns to the step b4 in which the next one unit of string of characters is extracted and the pronunciation and the scroll display are performed.

Figure 8:
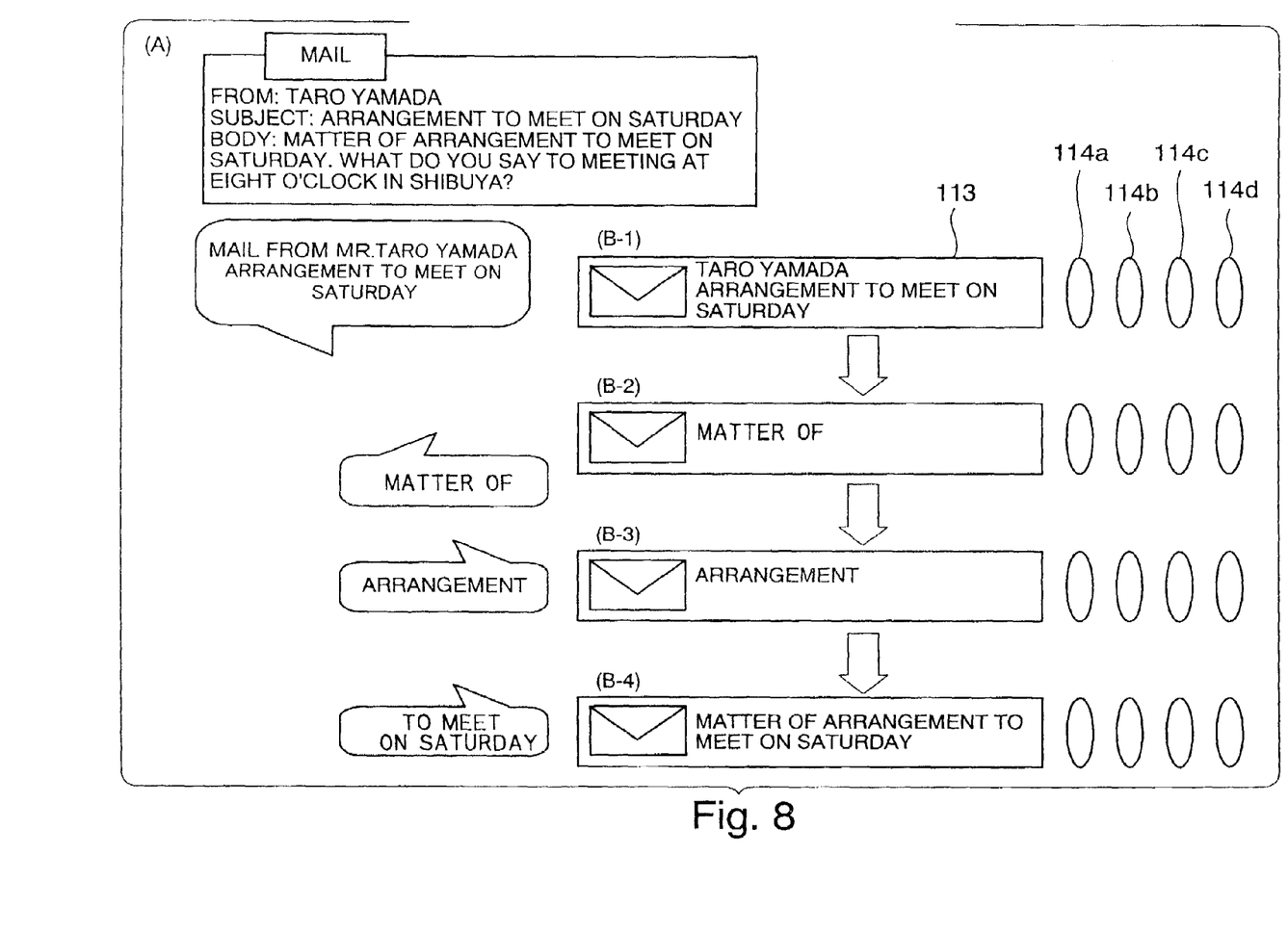
FIG. 8 is a typical illustration showing an example of display and pronunciation.

FIG. 8 is a typical illustration showing an example of display and pronunciation.

Here, it is assumed that there is received, as shown in part (A) of FIG. 8, such a mail that From (destination) is "Taro Yamada", Subject (Title) is "Arrangement to meet on Saturday", and Body (Mail text) is "It is a matter of arrangement to meet on Saturday. What do you say to meeting at eight o'clock in Shibuya?".

At that time, first, as shown in part (B-1) of FIG. 8, From/Subject information is displayed on an auxiliary display screen 113 on a batch basis; and a voice of reading aloud of this "It is Mail from Mr. Taro Yamada. Arrangement to meet on Saturday" is outputted.

In reading aloud of From/Subject information, regarding the "From" information, reading aloud is made in a state that an accessory explanation sentence (e.g. "It is Mail from Mr.") is added to the substantial contents. And in order that contents of the "From" information can be distinguished from contents of the "Subject" information, reading aloud is made with a suitable pause.

At this stage, when an auxiliary operation button 114a is depressed, it is decided that an operation of the "preceding movement" is made in the step a4 in FIG. 6, and when an auxiliary operation button 114b is depressed, it is decided that an operation of the "subsequent movement" is made in the step a6 in FIG. 6.

An auxiliary operation button 114c is a button for stopping a mail display/reading aloud processing. An auxiliary operation button 114d is a button for starting a mail management program constituting the mail management section 501 shown in FIG. 4, or a program for performing a substantial mail management to display a mail on the main display screen 121 of display panel 12.

Next, as shown in part (B-2) to (B-4) of FIG. 8, a string of characters "Matter of arrangement to meet on Saturday." is displayed on a scroll basis on the auxiliary display screen 113, and the same contents "It is a matter of arrangement to meet on Saturday" is announced. Synchronization between the scroll display and the audio output is established at the head of the string of characters. But the display is concerned with eight characters of "Matter of arrangement to meet on Saturday.". On the other hand, the audio output is concerned with ten characters of "It is a matter of arrangement to meet on Saturday". Thus, the end of the scroll display is slightly different from the end of the audio output in time. There is a tendency that the this difference is enlarged as a string of characters lengthy in unit length and a string of characters having a lot of Chinese characters are displayed on a scroll basis and are announced. However, in the present embodiment, this difference is ignored.

When the scroll display and the pronouncement of a string of characters "Matter of arrangement to meet on Saturday." are terminated, the display on the auxiliary display screen 113 is disappears once, and next the scroll display and the pronouncement of a string of characters "What do you say to meeting at eight o'clock in Shibuya?" are initiated with synchronization at the head of the string of characters.

In the event that the operation buttons 114a and 114b are operated when the scroll display and the pronouncement of the mail text is being performed, it is decided that the operations of the "preceding movement" and the "subsequent movement" are made in the step a10 and a11 in FIG. 6, respectively.

Figure 9:
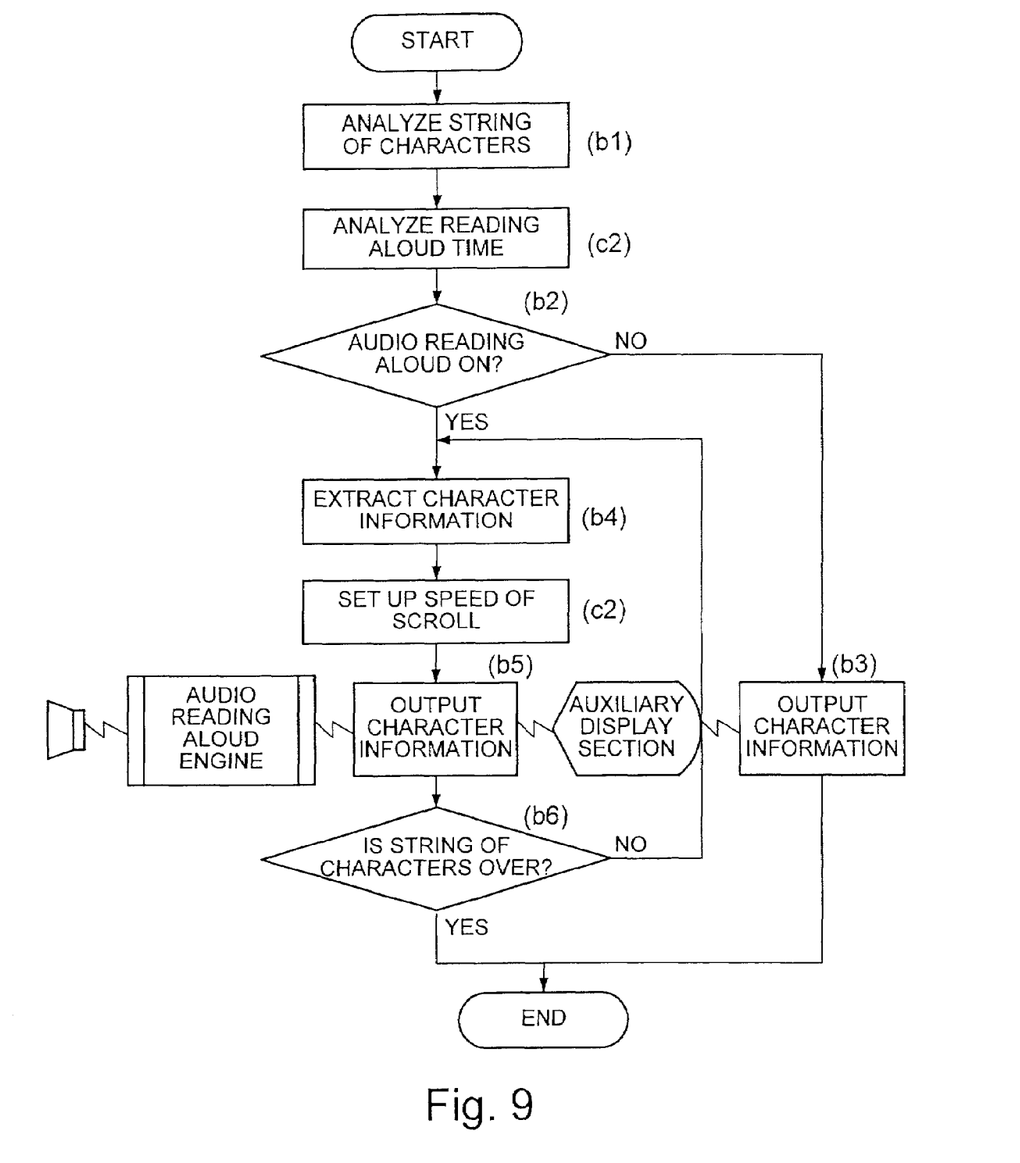
FIG. 9 is a flowchart useful for understanding an alternative auxiliary display/audio reading aloud processing instead of FIG. 7.

FIG. 9 is a flowchart useful for understanding an alternative auxiliary display/audio reading aloud processing instead of FIG. 7. In FIG. 9, the same parts are denoted by the same reference numbers as those of FIG. 7. And redundant explanation will be omitted.

After the analysis of a string of characters is performed in the step b1, the process goes to a step c1 in which there is analyzed time required for reading aloud of each of the strings of characters for each unit punctuated by a period and the like. And after a unit of string of characters punctuated by a period and the like is extracted in a step b4, in a step c2, a scroll speed is set up in such a manner that a time for a scroll display of the extracted string of characters is coincident with a time for an output of a speech sound reading aloud the extracted string of characters. In the step b5, the speech sound reading aloud the extracted string of characters is outputted, and in synchronism with this, the extracted string of characters is scroll-displayed on the auxiliary display screen at the scroll speed set up in the step c2.

Adoption of the auxiliary display/audio reading aloud processing shown in FIG. 9 instead of the auxiliary display/audio reading aloud processing shown in FIG. 7 makes it possible to establish more fine synchronization between the scroll display and the audio output.

As an alternative embodiment, the following embodiment can be considered.

According to the above-mentioned embodiment, the From/Subject information is displayed on a batch basis, and not on a scroll basis. However, it is acceptable that those types of information are individually displayed on a scroll basis.

Further, according to the above-mentioned embodiment, an object string of characters is displayed on the auxiliary display screen so as to be scrolled in the left direction. However, it is acceptable that the object string of characters is displayed on the auxiliary display screen so as to be sequentially displayed one by one in character from the left to the right of the auxiliary display screen, so that in the event that the string of characters of interest cannot be displayed at a time on the auxiliary display screen or in the event that the subsequent unit of string of characters is displayed, the string of characters, which is now displayed on the auxiliary display screen, is erased, and the subsequent string of characters is displayed one by one in character from the left to the right of the auxiliary display screen, and this operation is repeatedly performed.

As mentioned above, according to the present invention, it is possible to perform an effective notification for a user.

Further, according to the present invention, information is outputted on an audio basis and a screen display is performed in synchronism with the audio output. This feature makes it possible to confirm contents of information through reading aloud, and also to immediately confirm on a screen the contents of information, which an operator fails to hear through the reading aloud. In the event that the contents of information is displayed on an auxiliary display screen, which is smaller than a main display screen, but not on the main display screen, it is possible for an operator to understand the contents of information, which the operator fails to hear through the reading aloud, without locating it from the contents of display on the screen.

While the present invention has been described with reference to the particular illustrative embodiments, it is not to be restricted by those embodiments but only by the appended claims. It is to be appreciated that those skilled in the art can change or modify the embodiments without departing from the scope and sprit of the present invention.

What is claimed is:

1. An information processing apparatus for displaying information on a display screen comprising:

an audio output section for generating and outputting a voice based on character information;

an information notification section for displaying pieces of character information of interest in a predetermined unit on said display screen and for causing said audio output section to generate and output the voice involved in reading aloud of the character information in synchronism with a display of the character information;

an electronic mail receiving section, wherein said information notification section displays character information of interest onto said, display screen and causes the audio output section to generate and output audio as the character information of interest is displayed on the screen, wherein an electronic mail received by said electronic mail receiving section is provided as the character information of interest, wherein, after a display and audio output of From/Subject information of an obtained electronic mail is performed, a display and audio output of text information of said obtained electronic mail is automatically performed if an operation for moving to a predetermined mail or subsequent mail is not performed, and if an operation for moving to a predetermined mail or subsequent mail is performed, a display and audio output of From/Subject information with respect to said predetermined mail or subsequent mail is performed; and wherein said information notification section displays the text information by scrolling the text information across the display screen and displays the From/Subject information on a batch basis without scrolling the From/Subject information.

2. An information processing apparatus according to claim 1, wherein said information notification section displays the pieces of character information of interest on said display screen and causes said audio output section to generate and output the voice involved in reading aloud of the character information, and said character information is displayed in synchronization with predetermined distinction codes.

3. An information processing apparatus according to claim 1, wherein a time length of the voice involved in reading aloud of the character information is determined and the voice involved in reading aloud of the information is generated and outputted, and further a timing of a display of the character information on said display screen is controlled in accordance with the time length of the voice involved in reading aloud of the character information.

4. An information processing apparatus according to claim 1, further comprising a handler for controlling character information to be displayed on said display screen, wherein said information notification section redisplays character information now displayed on said display screen from the beginning of the character information, displays additional character information instead of the redisplayed character information, and causes the audio output section to generate and output the voice involved in reading aloud of the character information in accordance with the character information displayed.

5. An information processing apparatus according to claim 1, wherein said information notification section displays the electronic mail onto said display screen and causes the audio output section to generate and output audio as the character information of interest is displayed on the screen, only if the character information of interest is a new electronic mail.

6. An information processing apparatus according to claim 1, further comprising a main display screen and an auxiliary display screen, wherein said auxiliary display screen is the display screen.

7. An information processing apparatus according to claim 6, wherein said auxiliary display screen is smaller in size than said main display screen.

8. An information processing apparatus according to claim 6, further comprising a display panel connected to a main frame on a hinge basis, which is closed by folding and is opened in a using state,
wherein said main display screen is disposed at an inside wall of said display panel in a folded state,
said auxiliary display screen is provided at a position capable of being referred to by a user even in a state that said display panel is folded.

9. An information processing apparatus according to claim 8, wherein said auxiliary display screen is disposed out of a portion, which is covered by said display panel in the folded state, of said main frame.

10. A control apparatus for controlling display of information onto a display screen in an information processing apparatus, said control apparatus comprising:
an information notification section for displaying pieces of character information of interest in a predetermined unit on said display screen and for causing an audio output section to generate and output a voice involved in reading aloud of the character information as the character information of interest is displayed;
an electronic mail receiving section,
wherein said information notification section displays character information of interest onto said display screen and causes the audio output section to generate and output audio as the character information of interest is displayed on the screen,
wherein an electronic mail received by said electronic mail receiving section is provided as the character information of interest,
wherein, after a display and audio output of From/Subject information of an obtained electronic mail is performed, a display and audio output of text information of said obtained electronic mail is automatically performed if an operation for moving to a predetermined mail or subsequent mail is not performed, and if an operation for moving to a predetermined mail or subsequent mail is performed, a display and audio output of From/Subject information with respect to said predetermined mail or subsequent mail is performed; and
wherein said information notification section displays the text information by scrolling the text information across the display screen and displays the From/Subject information on a batch basis without scrolling the From/Subject information.

11. A control apparatus according to claim 10, wherein said information notification section displays the pieces of character information of interest by scrolling the pieces of character information of interest across the display screen.

12. A control apparatus according to claim 10, wherein said information notification section displays the pieces of character information of interest on said display screen and causes said audio output section to generate and output the voice involved in reading aloud of the character information, and said character information is displayed in synchronization with predetermined distinction codes.

13. A control apparatus according to claim 10, wherein a time length of the voice involved in reading aloud of the information is determined and the voice involved in reading aloud of the character information is generated and outputted, and further a timing of a display of the character information on said display screen is controlled in accordance with the time length of the voice involved in reading aloud of the character information.

14. A control apparatus according to claim 10, wherein said information processing apparatus comprises a handler for controlling character information to be displayed on said display screen, and said information notification section redisplays character information now displayed on said display screen from the beginning of the information, displays additional character information instead of the redisplayed character information, and causes the audio output section to generate and output the voice involved in reading aloud of the character information in accordance with the character information displayed.

15. A control apparatus according to claim 10, wherein said information notification section displays the electronic mail onto said display screen and generates and outputs audio as the character information of interest is displayed on the screen, only if the character information of interest is new electronic mail.

16. A control apparatus according to claim 10, wherein said information processing apparatus comprises a main display screen and an auxiliary display screen being smaller in size than said main display screen, and said auxiliary display screen is the display screen.

17. A recording medium capable of being read by a computer displaying information on a display screen, the recording medium storing a program causing the computer to perform:
- generating and outputting a voice involved in reading aloud of character information of interest;
- displaying pieces of character information of interest on said display screen, the voice being synchronized with the character information displayed such that the character information displayed is read aloud as it is displayed;
- when an electronic mail is received by the computer is provided as the character information of interest, displaying and outputting audio of From/Subject information of the obtained electronic mail, and automatically displaying and outputting audio output of text information of said obtained electronic mail if an operation for moving to a predetermined mail or subsequent mail is not performed, and if an operation for moving to a predetermined mail or subsequent mail is performed, a display and audio output of From/Subject information with respect to said predetermined mail or subsequent mail is performed; and
- wherein the text information is displayed by scrolling the text information across the display screen and the From/Subject information is displayed on a batch basis without scrolling the From/Subject information.

18. A recording medium according to claim 17, wherein said program displays the pieces of character information of interest by scrolling the pieces of character information of interest across the display screen.

19. A recording medium according to claim 17, wherein said program displays the pieces of character information of interest on said display screen and causes said audio output section to generate and output the voice involved in reading aloud of the character information, and said character information is displayed in synchronization with predetermined distinction codes.

20. A recording medium according to claim 17, wherein a time length of the voice involved in reading aloud of the character information is determined and the voice involved in reading aloud of the character information is generated and outputted, and further a timing of a display of the character information on said display screen is controlled in accordance with the time length of the voice involved in reading aloud of the character information.

* * * * *